(12) United States Patent
Crangle et al.

(10) Patent No.: US 6,928,620 B1
(45) Date of Patent: Aug. 9, 2005

(54) DIRECT PRINTING OF CONTENTS OF A UNIVERSAL RESOURCE LOCATOR

(75) Inventors: Kenneth W. Crangle, Albany, OR (US); Donald X. Smith, II, Corvallis, OR (US); Dana E. Laursen, Corvallis, OR (US); Theodore E. Ransom, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 348 days.

(21) Appl. No.: 09/694,546

(22) Filed: Oct. 23, 2000

(51) Int. Cl.[7] .............................................. G06F 13/00
(52) U.S. Cl. ...................................... 715/769; 715/770
(58) Field of Search ................................. 715/769, 770, 715/761, 779; 345/835, 839, 781, 762, 765, 769, 763, 764

(56) References Cited

U.S. PATENT DOCUMENTS

| | | | | |
|---|---|---|---|---|
| 5,724,595 A | * | 3/1998 | Gentner | 345/762 |
| 5,917,491 A | * | 6/1999 | Bauersfeld | 345/835 |
| 5,978,842 A | | 11/1999 | Noble et al. | |
| 6,008,811 A | * | 12/1999 | McMillan | 345/835 |
| 6,029,141 A | | 2/2000 | Bezos et al. | |
| 6,057,834 A | * | 5/2000 | Pickover | 345/765 |
| 6,189,018 B1 | * | 2/2001 | Newman et al. | 707/501 |

FOREIGN PATENT DOCUMENTS

| | | |
|---|---|---|
| EP | 0 851 367 | 7/1998 |
| EP | 0834822 | 8/1998 |
| EP | 0 646 857 | 12/1998 |

OTHER PUBLICATIONS

Hewlett–Packard, copyright 1994–2000, HP Instant Delivery [Online]. Available: http://www.instant–delivery.com/Home [Jul. 10, 2000].

Hewlett–Packard, HP Instant Delivery, What is Instant Delivery? [Online]. Available: http://www.instant–delivery.com/Home/whatis.asp [Jul. 10, 2000].

Hewlett–Packard, HP Instant Delivery, General Questions [Online]. Available: http://www.instant–delivery.com/helpdesk [Jul. 10, 2000].

* cited by examiner

*Primary Examiner*—Cao (Kevin) Nguyen (57) ABSTRACT

A URL page is printed by a computing system. When a reference to a URL address is dragged and dropped upon a print icon, the URL page is accessed from the Internet. The URL page is then printed on a printer. When the URL page is accessed and printed, the URL page is not displayed to a user of the computing system. Also, when a reference to the URL address for the URL page is dragged and dropped upon a desktop for a computing system, a special icon representing the URL page address is created on the desktop. Upon a user performing a function to activate the special icon, the URL page is printed.

20 Claims, 7 Drawing Sheets

DIRECT PRINTING OF CONTENTS OF A UNIVERSAL RESOURCE LOCATOR

BACKGROUND

The Internet started as a cooperative research effort of the United States Federal Government known as the Advanced Research Project Agency Network (ARPAnet). The ARPAnet tied universities and research and development organizations to the U.S. military establishment. More recently, the Internet has extended its use commercially and internationally. It is the world's largest computer network.

A Universal Resource Locator (URL) address is an Internet address. A URL address consists of a string expression that designates a resource (referred to herein as a URL page) on the Internet. For example the resource is a particular file on a computer connected to the Internet.

Web browsers such as Netscape Navigator browser available from Netscape, and Internet Explorer browser available from Microsoft Corporation use URL addresses to access resources (URL pages) on the Internet. Once accessed, these resources (URL pages) can be printed from the web browser using a print command.

The Internet Explorer browser includes a history window that lists the names and URL addresses of recently visited resources (URL pages). It is possible to "drag and drop" an entry in the history window to a computer desktop. Selecting the resulting icon results in the Internet Explorer browser accessing the resource (URL page) and displaying the URL page within a window of the Internet Explorer browser.

While currently available web browsers provide for accessing and printing of URL pages, it is always desirable to provide more convenient ways to access and print information from the Internet.

SUMMARY OF THE INVENTION

In accordance with the preferred embodiment of the present invention, a URL page is printed by a computing system. When a reference to a URL address is dragged and dropped upon a print icon, the URL page is accessed from the Internet. The URL page is then printed on a printer. When the URL page is accessed and printed, the URL page is not displayed to a user of the computing system. The reference to the URL address can be the URL address itself or any label or other combination of characters that is used to identify the URL address.

In one preferred embodiment of the present invention, when the URL page is unchanged from a time when the URL page was previously printed by the computing system, the user of the computing system is notified and given an opportunity to cancel printing.

For example, the reference to the URL address is dragged from a subscription list available as part of a resource utilized by a print delivery Internet site. Alternatively, the reference to the URL address is dragged from URL addresses listed in a user-generated file. For example, URL addresses listed in a user-generated file may be selected from a browser history window or a browser history file. The reference to the URL address can also be dragged directly from URL addresses listed in a browser history window or a browser history file. Alternatively, the reference to the URL address can be contained within a URL print icon or contained within a browser shortcut icon on the desktop. Unless the URL addresses are moved directly from an open browser window, it is not necessary for the browser to be open or any browser window to be open when the printing is performed.

In an alternative method for printing a URL page, when a reference to the URL address for the URL page is dragged and dropped upon a desktop for a computing system, a special icon representing the URL page address is created on the desktop. Upon a user performing a function to activate the special icon, the URL page is printed.

For example, the special icon is activated by double clicking on the special icon. Alternatively, the special icon is activated by dragging and dropping the special icon on a print icon. The special icon can also be activated by selecting the special icon and then selecting a print command from a menu or using short-cut keys on the keyboard.

Similar to the previously described method, the printing can be performed without displaying the URL page to the user of the computing system. Also, when the URL page is unchanged from a time when the URL page was previously printed by the computing system, the user of the computing system can be notified and given an opportunity to cancel printing. The reference to the URL address can be, for example, dragged from a subscription list available as part of a resource utilized by a print delivery Internet site, dragged from URL addresses listed in any file, dragged from URL addresses listed in a browser history window or file or obtained using a URL print icon or a browser shortcut icon.

The present invention provides for a convenient shortcut that allows efficient printing of a URL page.

DESCRIPTION OF THE PREFERRED EMBODIMENT

Figure 1:
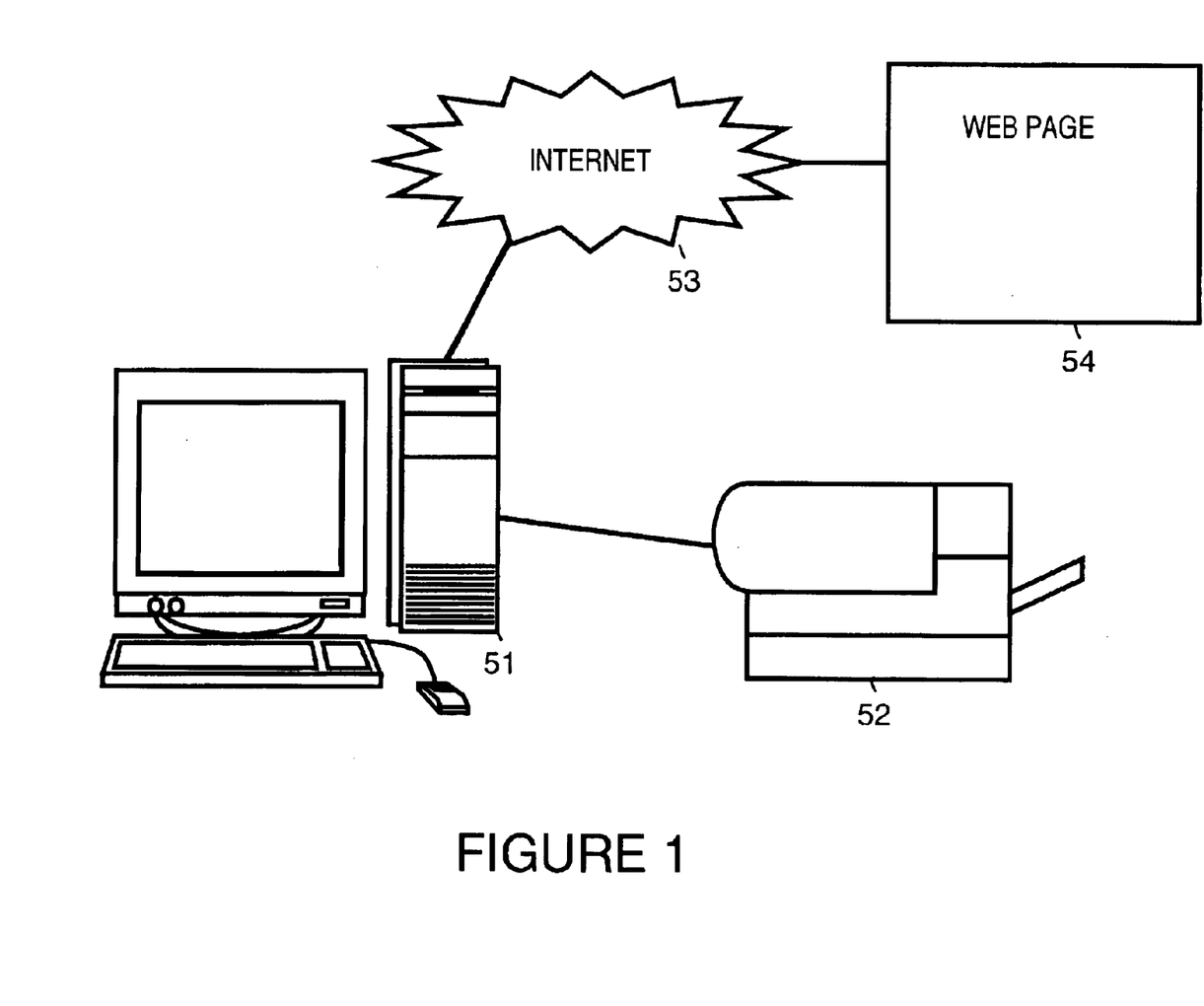
FIG. 1 shows a simplified block diagram of a computer connected to a printer and to the Internet.

FIG. 1 shows a computer system 51 connected to a printer 52 and to the Internet 53. For example, computer system 51 is accessing a web page 54 via Internet 53 for the purpose of printing web page 54. There are often times when a user of computer system 51 would like to receive the latest printout from a URL page. Seldom can it be predicted accurately when a URL page will be updated, so scheduled printing may not be the best solution.

In preferred embodiments of the present invention, dragging and dropping a reference to a URL address onto a special print icon located on the desktop results in printing the contents of that URL page. While in the discussion below the reference to the URL address is described as the URL address itself, the reference to the URL address can also be any label or other combination of characters that is used to identify the URL address. For example, the URL address can be the title of a web page or a user-given name that identifies the URL address. The URL address can reference any site on the Internet.

Figure 2:
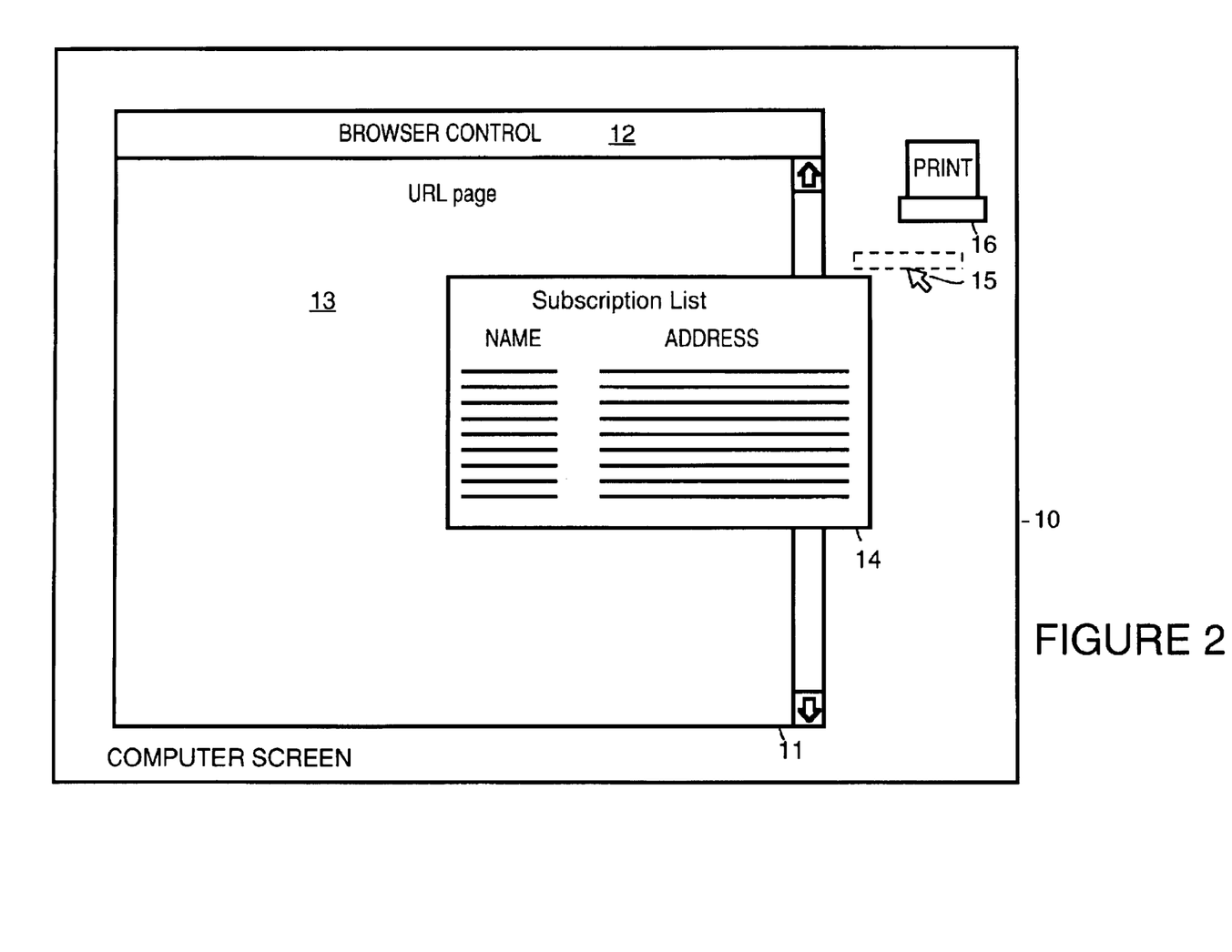
FIG. 2 illustrates printing the contents of a URL page by dragging and dropping the URL address from a subscription list to a printer icon in accordance with a preferred embodiment of the present invention.

For example, FIG. 2 shows a web browser window 11 opened on a display screen 10. Web browser window 11 includes a browser control area 12 and an area 13 that displays a current URL page.

A subscription list 14 containing subscription entries may be, for example, the subscription list could be the Delivery Manager window for the HP Instant Delivery system. Each subscription entry includes, for example, the name and/or URL address for a URL page to which a user subscribes. Using a cursor 15, the user can drag a subscription entry and drop it on a print icon 16. This results in the URL page designated by the URL address being printed. Printing also can be enabled using a designated combination of key strokes, select a printing function from a menu, etc. Also, while in FIG. 2 web browser window 11 is shown open, as long as a URL address or another type of reference to a URL address resides in a file located within computing system 51, it is not necessary that any window of the web browser be open in order to activate the printing nor is it necessary that the web browser be enabled or running.

Figure 3:
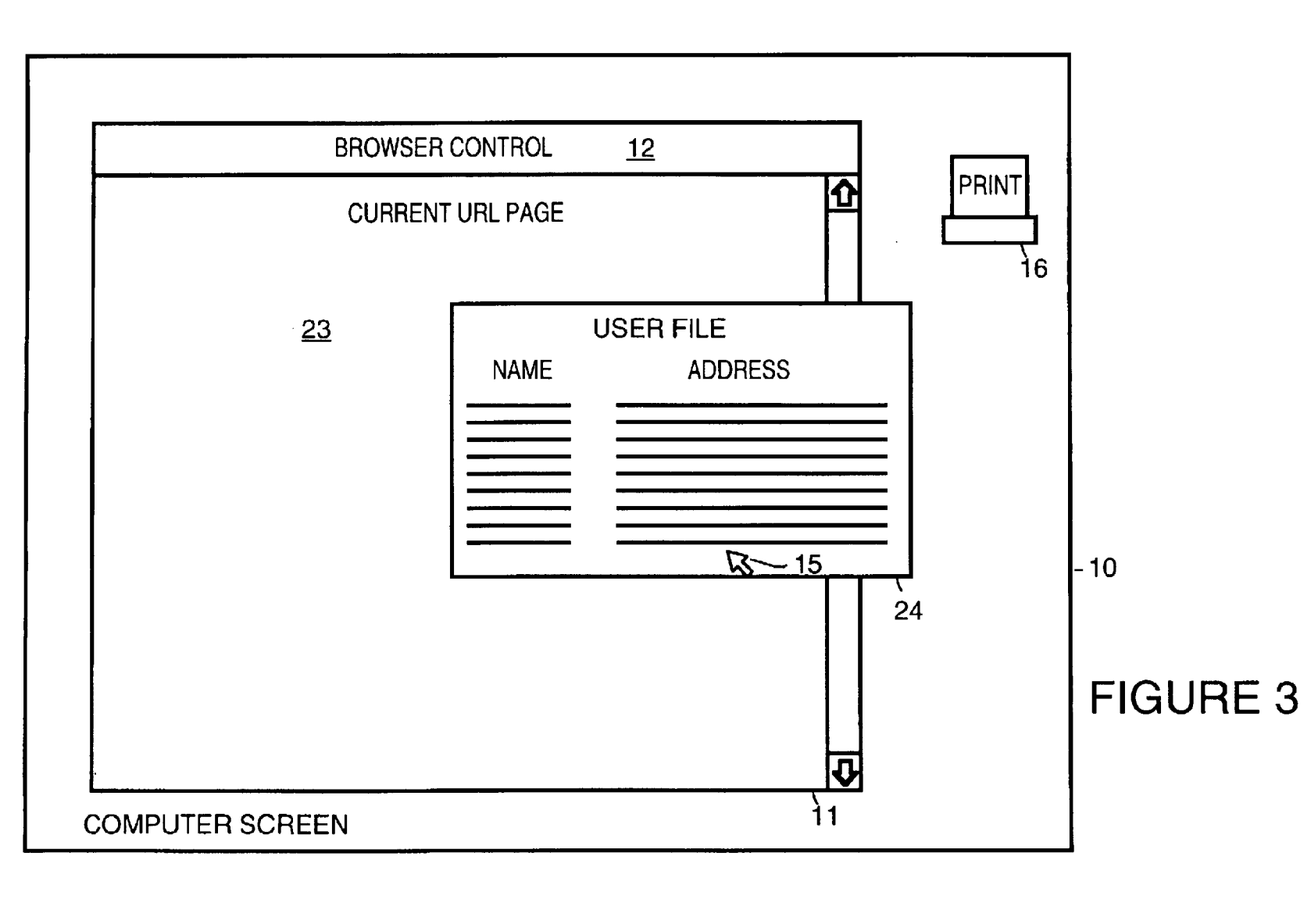
FIG. 3 a user list contains a list of the name and URL address of URL pages in accordance with a preferred embodiment of the present invention.

Likewise, FIG. 3 shows web browser window 11 opened on display screen 10. Web browser window 11 includes browser control area 12 and a currently displayed URL page 23. A user list 24 contains a list of the name and URL address of URL pages. For example, user file 24 is created by a client that fetches URL pages previously visited by the web browser and stored in a history file, a history list, or a favorites list, etc. Alternatively, user file 24 can be created by a user typing selected URLs directly into user file 24, or by any other way which URL addresses may be entered into a file. Each entry in user file 24 includes the name and URL address for a URL page. Alternatively, each entry contains only the URL address for the URL page. Using cursor 15, the user can drag an entry and drop it on print icon 16. This results in the URL page designated by the URL address being printed.

Figure 4:
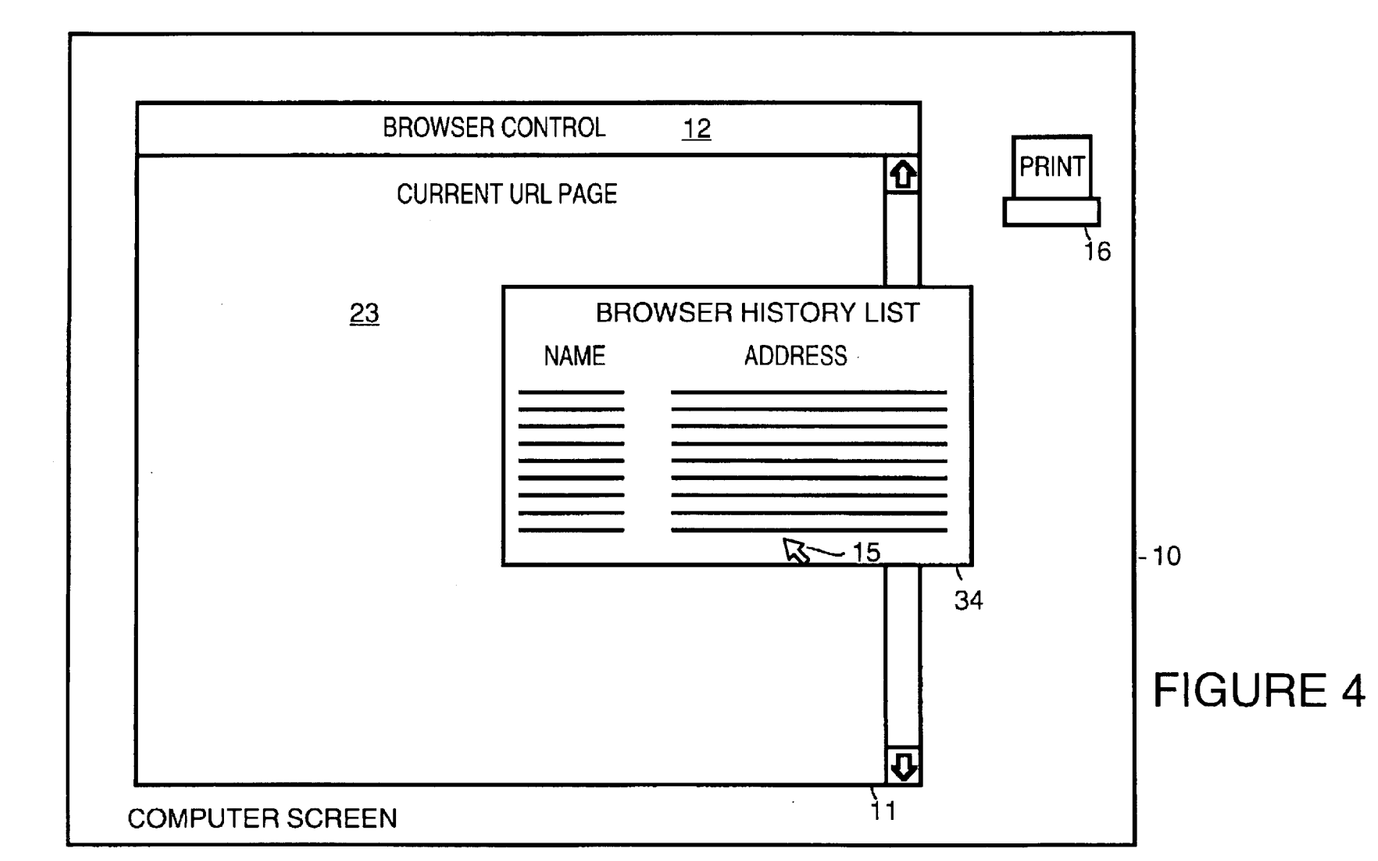
FIG. 4 illustrates printing the contents of a URL page by dragging and dropping the URL address from a web browser history list to a printer icon in accordance with a preferred embodiment of the present invention.

Similarly, FIG. 4 shows web browser window 11 opened on display screen 10. Web browser window 11 includes browser control area 12 and currently displayed URL page 23. A browser history window 34 contains a list of the name and/or URL address of URL pages. For example, browser history window 34 the history file created by the web browser. Each entry in the browser history window 34 includes the name and URL address for a URL page. Using cursor 15, the user can drag an entry and drop it on print icon 16. This results in the URL page designated by the URL address being printed.

Alternatively, dragging and dropping a URL address from one of the sources listed above onto the desktop results in the formation of a URL print icon.

Figure 5:
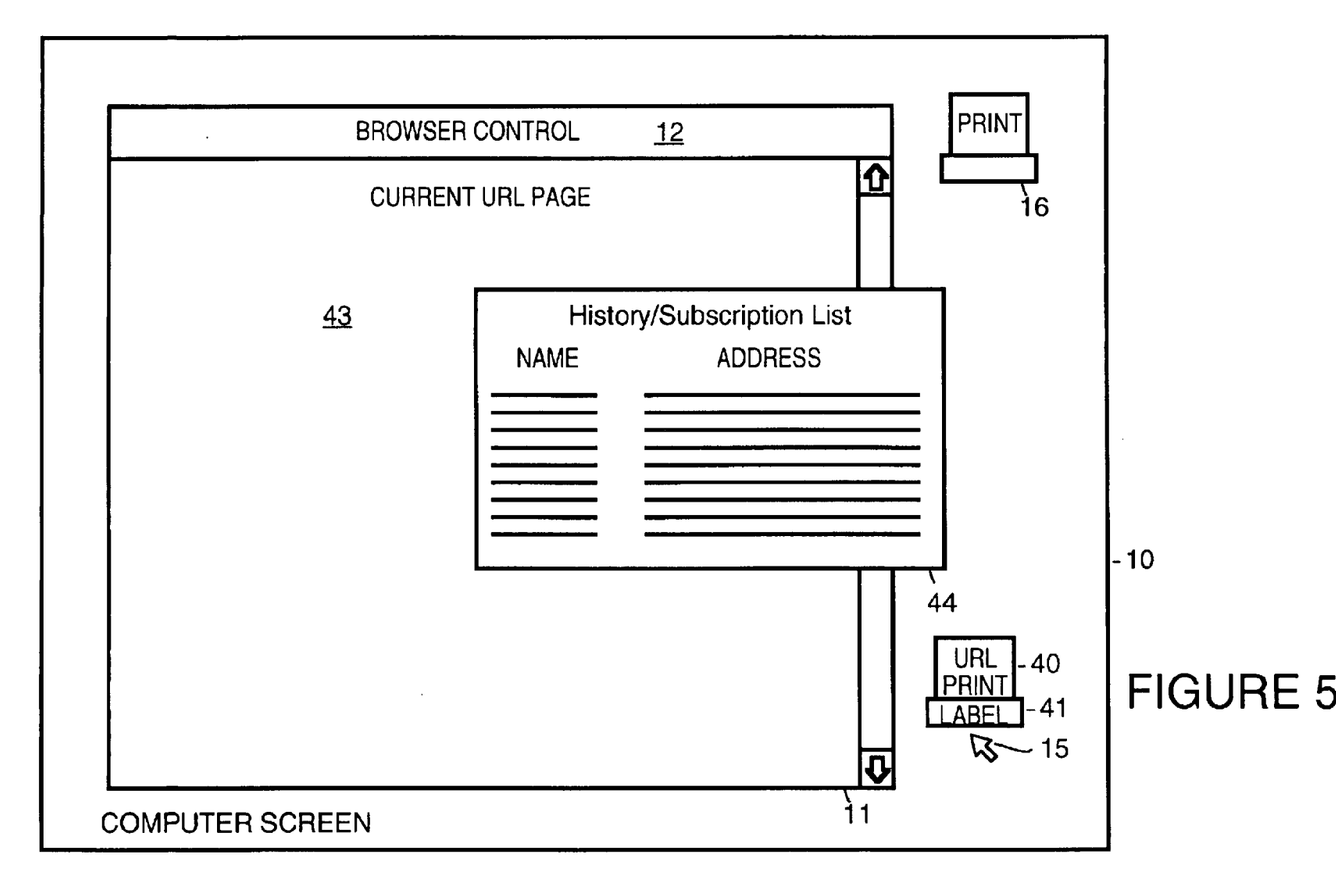
FIG. 5 illustrates efficient provision for printing the contents of a URL page by dragging and dropping the URL address from a subscription list, client history list or web browser history list to the desktop to create a URL printer icon in accordance with a preferred embodiment of the present invention.

This is illustrated by FIG. 5. FIG. 5 shows web browser window 11 opened on display screen 10. Web browser window 11 includes browser control area 12 and currently displayed URL page 43. A window 44 contains a list of the name and URL address of URL pages. Window 44 is, for example, a subscription list, a user file, a browser history file or a browser history window, as described above. Using cursor 15, the user can drag an entry and drop it on the desktop represented by unused portions of display screen 10. Doing so results in the creation of a URL print icon 40. A label 41, for example, contains the name and/or URL address of the URL page or a user defined label. Web browser window 11 need not be open when creating URL print icon 40.

When dragging and dropping to the desktop from a browser history list, a key combination (such as holding down the "Shift" key) is used during the operation for some web browsers. This is in order to preserve current functionality of web browsers that allow creation of a "short-cut" icon on the desktop from which the URL page can be accessed by the web browser. When the key combination is used during the drag and drop operation, URL print icon 40 is created. When the key combination is not used, the browser "short-cut" icon is created. In order to print a URL page represented by a browser "short-cut" icon, the browser shortcut icon is dragged and dropped on print icon 16. Alternatively, to print the URL page, the associated browser short-cut icon is selected followed by the selection of a print command, for example, from a menu or using a short-cut combination of keys. Web browser window 11 need not be open when printing browser short-cut icon.

When URL print icon 40 is double clicked the URL page is printed on printer 52. The URL page can also be printed using other methods. For example, URL print icon 40 can be dragged and dropped on print icon 16. Also, URL print icon 40 can be selected followed by a print command being selected from a menu or using a short-cut combination of keys.

Figure 6:
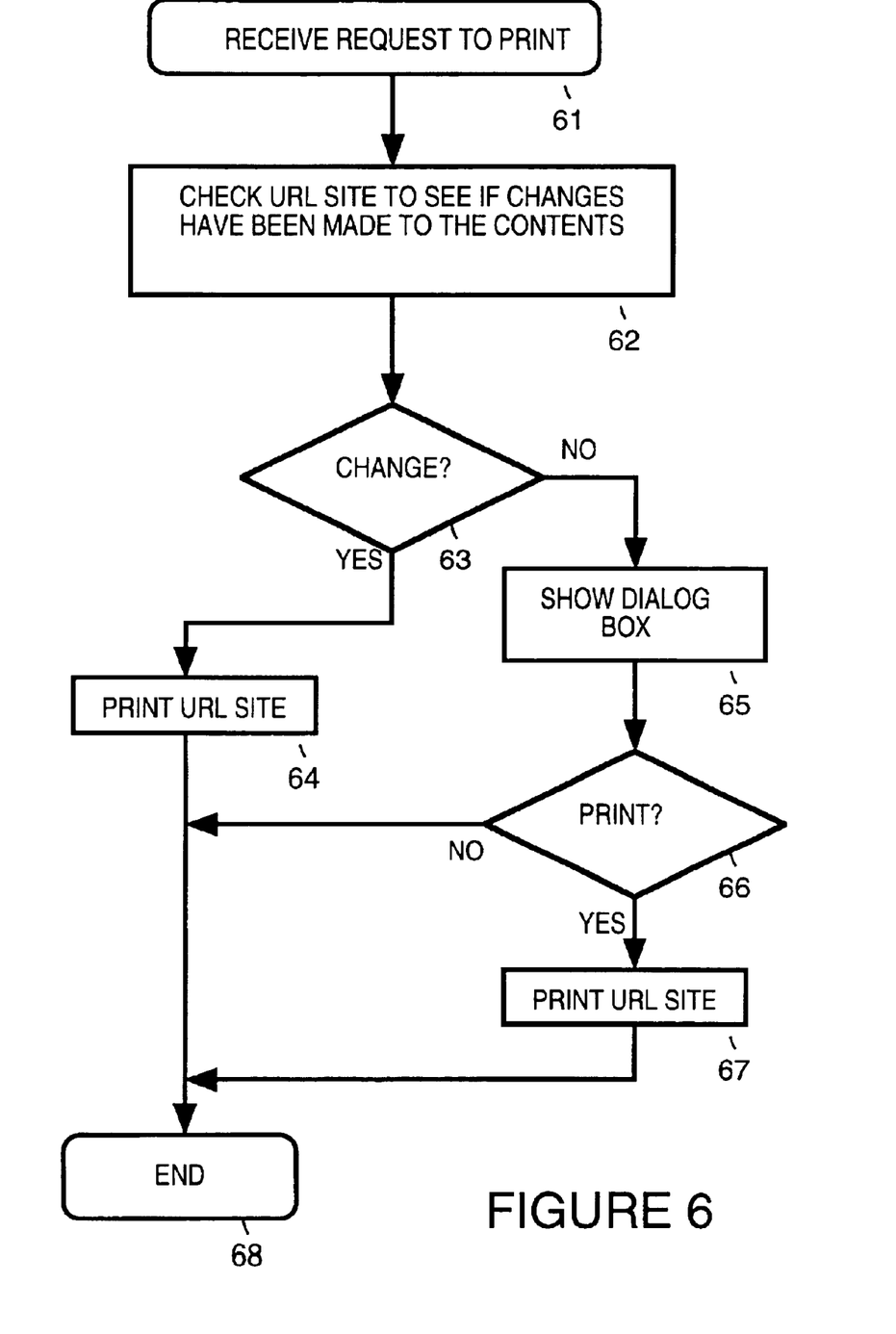
FIG. 6 is a flowchart that describes a printing process in accordance with a preferred embodiment of the present invention.

FIG. 6 is a flowchart that describes the printing process. This printing process is invoked, for example, whenever a URL page is printed. Alternatively, URL pages can be printed directly without, for example, checking for changes to the URL page.

In a step 61, a print request is received. In a step 62, the URL page to be printed is accessed to determine if any changes to the URL page have been made since last printed by computer system 51. From a step 63, if a change has been made to the URL page since last printed by computer system 51, in a step 64, the URL page is printed. From step 63, if a change has not been made to the URL page since last printed by computer system 51, in a step 65, a dialog box 71 (shown in FIG. 7) is presented to the user.

Figure 7:
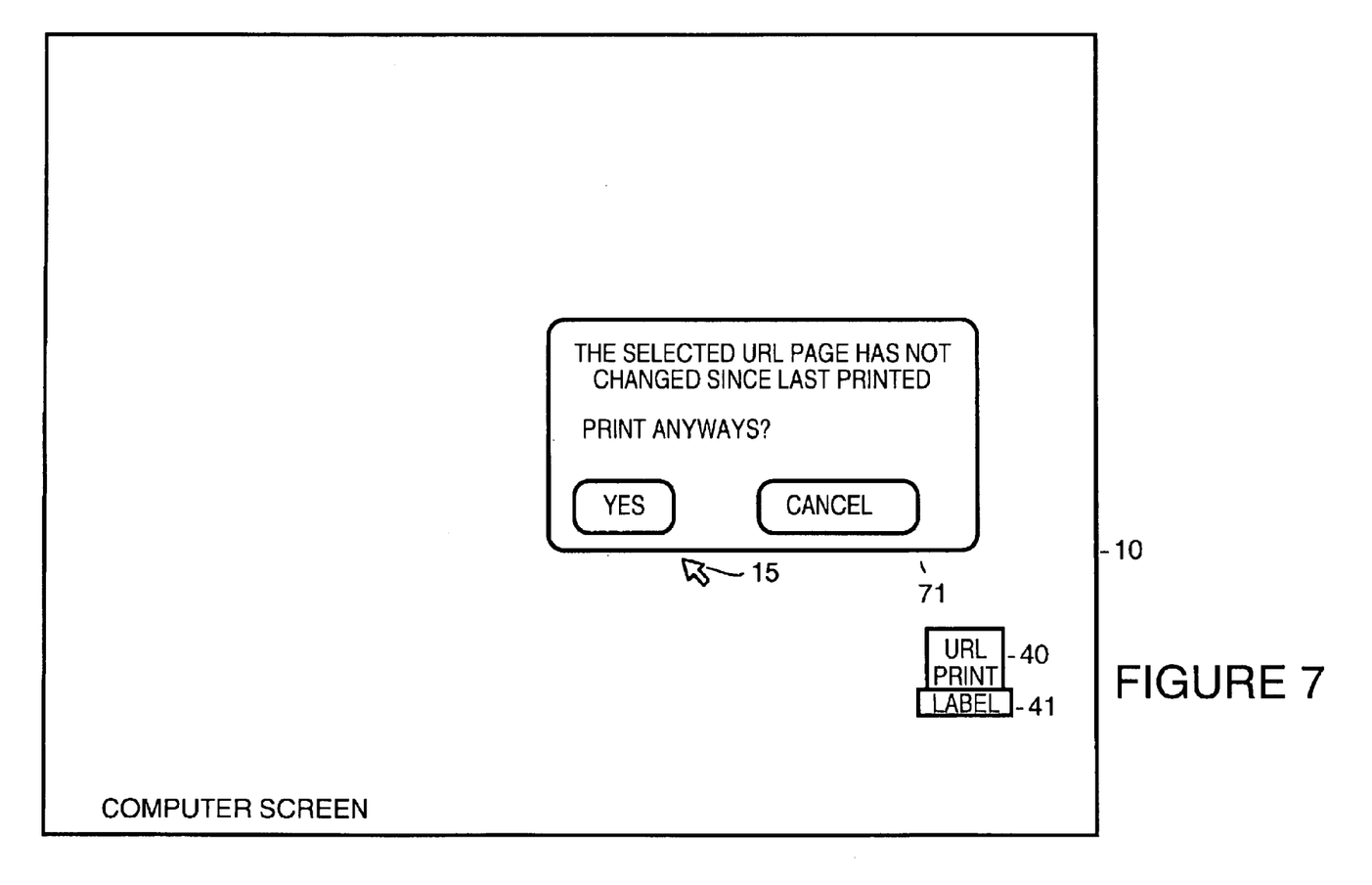
FIG. 7 shows a dialog box being displayed as a part of the printing process in accordance with a preferred embodiment of the present invention.

FIG. 7 shows dialog box 71. Dialog box 71 informs the user that the selected URL page has not changed since last printed. Dialog box 71 asks whether printing should continue. No web browser need be active during printing and no URL page need be displayed during printing.

If in a step 66 (shown in FIG. 6), the user chooses to continue with printing, in a step 67, the URL page is printed. If in step 66 the user chooses not to continue with printing, in a step 68, the print routine is completed without printing.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method for printing a URL page by a computing system, comprising the following steps:
 (a) when a reference to a URL address is dragged and dropped upon a print icon performing the following substeps:

(a.1) accessing the URL page from an Internet network; and, (a.2) printing the URL page on a printer;

wherein substep (a.1) and substep (a.2) are performed without displaying the URL page to a user of the computing system.

2. A method as in claim 1 wherein substep (a.2) includes the following substeps:

when the URL page is unchanged from a time when the URL page was previously printed by the computing system, so notifying the user of the computing system and giving the user of the computing system an opportunity to cancel printing.

3. A method as in claim 1 wherein in substep (a.1) the reference to the URL address is dragged from a subscription list available as part of a resource utilized by a print delivery Internet site.

4. A method as in claim 1 wherein in substep (a.1) the reference to the URL address is dragged from URL addresses listed in a file.

5. A method as in claim 1 wherein in substep (a.1) the reference to the URL address is dragged from URL addresses listed in a browser history window.

6. A method as in claim 1 wherein in substep (a.1) the reference to the URL address is contained within a URL print icon.

7. A method as in claim 1 wherein in substep (a.1) the reference to the URL address is contained within a browser shortcut icon.

8. A method for printing a URL page by a computing system, comprising the following steps:

(a) when a reference to a URL address for the URL page is dragged and dropped upon a desktop for the computing system, performing the following substep:

(a.1) creating on the desktop a special icon representing the URL page address; and, (b) upon a user performing a function to activate the special icon, performing the following substep;

(b.1) printing the URL page.

9. A method as in claim 8, wherein substep (b.1) is performed without displaying the URL page to the user of the computing system.

10. A method as in claim 8 wherein substep (b.1) includes the following substeps:

when the URL page is unchanged from a time when the URL page was previously printed by the computing system, so notifying the user of the computing system and giving the user of the computing system an opportunity to cancel printing.

11. A method as in claim 8 wherein in step (a) the reference to the URL address is dragged from a subscription list available as part of a resource utilized by a print delivery Internet site.

12. A method as in claim 8 wherein in step (a) the reference to the URL address is dragged from URL addresses listed in a file.

13. A method as in claim 8 wherein in step (a) the reference to the URL address is dragged from URL addresses listed in a browser history window.

14. A method as in claim 8 wherein in step (b) the special icon is activated by double clicking on the special icon.

15. A method as in claim 8 wherein in step (b) the special icon is activated by dragging and dropping the special icon on a print icon.

16. Computer readable medium containing software, which when executed performs a method for printing a URL page by a computing system, the method comprising the following steps:

(a) when a reference to a URL address is dragged and dropped upon a print icon performing the following substeps:

(a.1) accessing the URL page from an Internet network; and, (a.2) printing the URL page on a printer;

wherein substep (a.1) and substep (a.2) are performed without displaying the URL page to a user of the computing system.

17. Computer readable medium as in claim 16 wherein substep (a.2) includes the following substeps:

when the URL page is unchanged from a time when the URL page was previously printed by the computing system, so notifying the user of the computing system and giving the user of the computing system an opportunity to cancel printing.

18. Computer readable medium as in claim 16 wherein in substep (a.1) the reference to the URL address is dragged from one of the following locations:

a subscription list available as part of a resource utilized by a print delivery Internet site;

URL addresses listed in a file;

URL addresses listed in a browser history window;

a URL print icon; and, a browser shortcut icon.

19. Computer readable medium containing software, which when executed performs a method for printing a URL page by a computing system, the method comprising the following steps:

(a) when a reference to a URL address for the URL page is dragged and dropped upon a desktop for the computing system, performing the following substep:

(a.1) creating on the desktop a special icon representing the URL page address; and, (b) upon a user performing a function to activate the special icon, performing the following substep;

(b.1) printing the URL page.

20. Computer readable medium as in claim 19 wherein substep (b.1) includes the following substeps:

when the URL page is unchanged from a time when the URL page was previously printed by the computing system, so notifying the user of the computing system and giving the user of the computing system an opportunity to cancel printing.

* * * * *